(12) United States Patent
Skoglund et al.

(10) Patent No.: US 10,271,565 B2
(45) Date of Patent: Apr. 30, 2019

(54) ICE CREAM MACHINE AND A METHOD FOR PRODUCING AN ICE CREAM PRODUCT USING AN ICE CREAM MACHINE

(71) Applicant: Tetra Laval Holdings & Finance S.A., Pully (CH)

(72) Inventors: Tomas Skoglund, Lund (SE); Jeanette Lindau, Södra Sandby (SE); Tommy Bonde, Silkeborg (DK); Per Henrick Hansen, Malling (DK); Ole Bendixen, Galten (DK)

(73) Assignee: TETRA LAVAL HOLDINGS & FINANCE S.A, Pully (CH)

( * ) Notice: Subject to any disclaimer, the term of this patent is extended or adjusted under 35 U.S.C. 154(b) by 0 days.

(21) Appl. No.: 15/575,843

(22) PCT Filed: Jun. 16, 2016

(86) PCT No.: PCT/EP2016/063883
§ 371 (c)(1),
(2) Date: Nov. 21, 2017

(87) PCT Pub. No.: WO2016/202921
PCT Pub. Date: Dec. 22, 2016

(65) Prior Publication Data
US 2018/0125090 A1    May 10, 2018

(30) Foreign Application Priority Data
Jun. 18, 2015   (SE) ...................................... 1550850

(51) Int. Cl.
A23G 9/26   (2006.01)
A23G 9/28   (2006.01)
(Continued)

(52) U.S. Cl.
CPC ............... *A23G 9/281* (2013.01); *A23G 9/26* (2013.01); *A23G 9/285* (2013.01); *B26D 1/06* (2013.01);
(Continued)

(58) Field of Classification Search
CPC ......... A23G 9/281; A23G 9/285; B26D 7/086
See application file for complete search history.

(56) References Cited

U.S. PATENT DOCUMENTS

2004/0134327 A1    7/2004  Capodieci
2006/0101956 A1*   5/2006  Hermansen ............ A23G 9/285
                                                              83/13
(Continued)

FOREIGN PATENT DOCUMENTS

AU    2035799 A1    9/1999
EP    0543628 A1    5/1993
(Continued)

OTHER PUBLICATIONS

International Search Report from corresponding PCT Application No. PCT/EP2016/063883 dated Sep. 12, 2016 (3 pages).
(Continued)

*Primary Examiner* — Elizabeth J Martin
(74) *Attorney, Agent, or Firm* — Finnegan, Henderson, Farabow, Garrett & Dunner LLP

(57) ABSTRACT

A method for producing an ice cream product with an ice cream machine having an extrusion nozzle and a cutting tool is provided. The method comprises providing an ice cream mixture, extruding the ice cream mixture through the extrusion nozzle, and cutting the ice cream mixture with the cutting tool into an ice cream product, wherein the cutting tool is an ultrasound cutting tool. An ice cream machine for producing an ice cream product is also provided.

20 Claims, 3 Drawing Sheets

(51) Int. Cl.
- *B26D 1/00* (2006.01)
- *B26D 1/06* (2006.01)
- *B26D 1/08* (2006.01)
- *B26D 1/09* (2006.01)
- *B26D 7/08* (2006.01)

(52) U.S. Cl.
CPC ............... *B26D 1/08* (2013.01); *B26D 1/09* (2013.01); *B26D 7/086* (2013.01); *B26D 2001/0066* (2013.01)

(56) References Cited

U.S. PATENT DOCUMENTS

| | | |
|---|---|---|
| 2007/0199423 A1 | 8/2007 | Capodieci |
| 2010/0028516 A1 | 2/2010 | Takeuchi et al. |
| 2010/0285187 A1* | 11/2010 | Weinstein ............ A21C 11/10 426/238 |

FOREIGN PATENT DOCUMENTS

| | | |
|---|---|---|
| GB | 2325192 A | 11/1998 |
| WO | WO 99-41995 A1 | 8/1999 |
| WO | WO 2004-012519 A1 | 2/2004 |

OTHER PUBLICATIONS

Office Action from corresponding Swedish Application No. 1550850-0 dated Dec. 11, 2015 (6 pages).

Sonics, "Ultrasonic Food Cutting", pp. 1-2, XP002761208, http://web.archive.org/web/20150608093203/http://www.sonics.com/plastic-datasheet/FoodCuttingSellSheet.pdf, Jun. 8, 2015.

* cited by examiner

ICE CREAM MACHINE AND A METHOD FOR PRODUCING AN ICE CREAM PRODUCT USING AN ICE CREAM MACHINE

CROSS-REFERENCE TO RELATED PATENT APPLICATIONS

This is a National Phase of International Application No. PCT/EP2016/063883, filed Jun. 16, 2016, which claims the benefit of Swedish Application No. 1550850-0, filed Jun. 18, 2015. The entire contents of the above-referenced applications are expressly incorporated herein by reference.

TECHNICAL FIELD

The present invention relates to a method for producing an ice cream product with an ice cream machine, and to an ice cream machine.

BACKGROUND ART

In the ice cream producing industry ice cream, or an ice cream mixture, is used to produce ice cream products. In the process, the ice cream is extruded through an extrusion nozzle and subsequently cut into ice cream products by means of a cutting tool. The cutting tool may e.g. be a knife, a scrape or a hot wire. Additionally, an ice cream stick is often inserted into the ice cream to produce so called ice cream lollies. Thereafter, the ice cream products can be put on a conveyer tray or a conveyer belt for further transportation to e.g. further processing, packaging and storing.

Some ice creams comprise inclusions or particles. These inclusions may cause a problem for the positioning of the stick in the ice cream as the inclusions may be located in a portion of the ice cream where the stick is to be inserted. Thus, the inclusions may cause a misplacement of the stick in the ice cream product. Even if no stick is included in the ice cream, problems can arise when the inclusions are cut by the cutting tool as the inclusions may be moved within the ice cream upon impact of the cutting tool, whereby holes and protrusions are formed within the ice cream product. Hereby, the ice cream product may get an undesired shape.

There is thus a need for improving the state of the art to provide for an ice cream machine which at least partly solves these problems.

SUMMARY OF THE INVENTION

It is an object of the present invention to improve the current state of the art, to solve at least some of the above problems, and to provide an improved ice cream machine. These and other objects are achieved by a method for producing an ice cream product with an ice cream machine, and an ice cream machine.

According to a first aspect of the present invention, a method for producing an ice cream product with an ice cream machine having an extrusion nozzle and a cutting tool, is provided for. The method comprises the steps of:
providing an ice cream mixture,
extruding the ice cream mixture through said extrusion nozzle,
cutting the ice cream mixture with said cutting tool into an ice cream product, wherein said cutting tool is an ultrasound cutting tool.

By cutting the ice cream mixture with an ultrasound cutting tool, a more efficient way of cutting the ice cream mixture is provided. With such an arrangement, the ice creams or ice cream products can be put on the conveyer tray in a repeatable manner with fewer misplaced or misaligned ice cream products.

The step of providing an ice cream mixture may comprise the step of providing an ice cream mixture with inclusions. When the ice cream mixture comprises inclusions or particles, the ultrasound cutting tool is advantageous to use as the ice cream as well as the inclusions can be efficiently cut through. Thus, the risk of causing the inclusions to slightly move within the ice cream whereby holes and protrusions are formed in the ice cream product is reduced or even eliminated. As a result, the risk of providing an ice cream product with an undesired shape is reduced. Furthermore, the risk of causing the ice cream products to be misplaced or misaligned on the conveyer tray is reduced as the ultrasound cutting tool can cut through the inclusions in a more efficient manner compared to prior art solutions. That is, non-uniform forces that may arise during cutting through the inclusions e.g. inclusions which are not evenly distributed within the ice cream, will cause a torque. The torque may cause misplacement of the ice cream products on the conveyor trays. This will lead to a waste of ice cream products as some of the downstream processes may require the ice cream products to be placed on the conveyer belt in an intended manner (i.e. the downstream processes may require that the ice cream ice cream products are suitably placed on the conveyer belt).

The inclusions may e.g. be hard inclusions such as hazelnuts or pieces of candy having a diameter of around 8 mm, and/or medium hard inclusions such as e.g. hazelnut flakes or candy pieces having a diameter of around 15 mm, and/or soft inclusions such as e.g. pieces of fruit or berries having a diameter of around 22 mm. The inclusion may have another particle size and be of another particle hardness then the ones described here. For example, the inclusions may have a diameter in the range of 5-25 mm.

The extrusion nozzle may comprise a flap arranged at an orifice of said extrusion nozzle, and the step of cutting the ice cream mixture with said cutting tool may comprise cutting the ice cream mixture against said flap.

In this embodiment, cutting of the ice cream mixture is performed at the extrusion nozzle, such as e.g. directly after the ice cream mixture is extruded through the extrusion nozzle, i.e. at the exit of the extrusion nozzle. The flap may act as an anvil for the cutting tool. Hereby, the cutting of the ice cream mixture can be carried out in a more efficient way. If inclusions are included in the ice cream mixture, the cutting of the inclusions can be carried out in a more efficient way. The flap may e.g. be made of plastic.

According to at least one example embodiment, the cutting tool is angled between 0° and 12°, preferably between 4° and 10°. Thus, the step of cutting the ice cream mixture may comprise cutting the ice cream mixture with said angled cutting tool.

In other words, the step of cutting the ice cream mixture with said cutting tool may comprise cutting said ice cream with the cutting tool being angled between 0° and 12°, preferably between 4° and 10°, or between e.g. 2° and 6°. This is advantageous because the size and shape of the ice cream products can be adapted to the rate of flow of the ice cream mixture out of the extrusion nozzle. In other words, because the ice cream mixture normally continuously flows out of the extrusion nozzle, and because the step of cutting through the ice cream mixture is not instantaneous, cutting the ice cream mixture with a straight cutting tool could result in an undesirable angled end section of the ice cream product. Thus, by cutting the ice cream mixture with an angled cutting tool, the risk of getting an undesirable angled end section of the ice cream product is reduced. Hence, the ice cream products can be shaped closer to its intended shape.

According to at least one example embodiment, the method comprising the step of arranging said cutting tool to cut the ice cream mixture while being angled of between 0° and 12°, preferably between 4° and 10°, or between e.g. 2° and 6°.

It should be noted that the angle of the cutting tool is to be measured compared to a cross section perpendicular to the flow of the ice cream mixture, and an axis having a component in a direction being opposite the to the flow of the ice cream mixture.

According to at least one example embodiment, the method comprises the step of moving said cutting tool at least partly transversally in a direction following the flow of the ice cream mixture. Thus, the cutting is not performed in an entirely perpendicular direction to the flow of the ice cream mixture which otherwise could result in an undesirable angled end section of the ice cream product.

In other words, and according to at least one example embodiment, the cutting tool moves, at least partly, transversally in the same direction as the flow of ice cream mixture out of the extrusion nozzle. Thus, the cutting tool may cut through the ice cream mixture the angled cutting tool as previously described, while the cutting tool moves, at least partly, transversally along with the flow of ice cream mixture. Preferably, the cutting tool also moves, at least partly, towards said ice cream mixture, and through said ice cream mixture in order for the cutting tool to be able to cut through the ice cream mixture. The speed of which the cutting tool moves transversally along with the flow of ice cream mixture may be higher, such as e.g. slightly higher, compared to the speed of which the ice cream mixture flows. Hereby, the shape of the ice cream product can be controlled more easily.

According to at least one example embodiment, the extrusion nozzle moves backwards and forwards as the ice cream mixture is extruded through the nozzle and subsequently cut, and new ice cream mixture is extruded through the extrusion nozzle. For example, the extrusion nozzle may move forward in a direction following the extrusion of the ice cream mixture out of the extrusion nozzle, while extruding ice cream mixture through the extrusion nozzle. The speed of the extrusion nozzle may be the same as the speed of the conveyer belt minus the speed of which the ice cream mixture is extruded through the nozzle. Hence, the ice cream mixture has preferably the same speed (being the speed of the extrusion nozzle moving forward, and the speed of which the ice cream mixture is extruded), as the speed of the conveyer belt. After the ice cream mixture has been cut, the extrusion nozzle may move backwards in a direction being opposite to said forward direction.

According to at least one example embodiment, the cutting tool comprises a cutting blade and a cutting blade holder, the former of which is an ultrasound cutting blade. Thus, the cutting blade holder may move together with the cutting blade, at least partly transversally along with the flow of ice cream mixture, and at least partly towards the ice cream mixture as the cutting blade cuts through the ice cream mixture while being angled as previously described.

The cutting tool may comprise at least two ultrasound cutting knives (or ultrasound horns) and the step of cutting the ice cream mixture with said cutting tool may comprise cutting the ice mixture with said at least two ultrasound cutting knives from opposite sides of the ice cream mixture.

Hereby, each of the two cutting knives cut halfway through the ice cream mixture. Thus, the time for cutting through the ice cream mixture can be reduced. As a result, the angle of which the cutting tool cuts through the ice cream mixture can be lower. It is advantageous to use ultrasound cutting knives as they to a lesser degree impair each other upon impact compared to e.g. conventional cutting knives, scrapes or wires. Furthermore, the risk of compressing the ice cream mixture and thereby end up with an undesired shape of the ice cream product is reduced.

The extrusion nozzle may be arranged horizontally and the extruding may be performed horizontally. According to at least one example embodiment, the extrusion nozzle is arranged vertically and the extruding is performed vertically. Hence, the method may comprise the step of providing an extrusion nozzle arranged to extrude ice cream mixture horizontally and/or the step of arranging the extrusion nozzle to extrude ice cream mixture horizontally, or the method may comprise the step of providing an extrusion nozzle arranged to extrude ice cream mixture vertically and/or the step of arranging the extrusion nozzle to extrude ice cream mixture vertically.

According to at least one example embodiment, the step of cutting comprises cutting the ice cream mixture in an essentially horizontally or vertically direction.

According to at least one example embodiment, the method comprises the step of extruding the ice cream mixture horizontally and cutting the ice cream mixture in an essentially vertically direction. According to at least one example embodiment, the method comprises the step of extruding the ice cream mixture vertically and cutting the ice cream mixture in an essentially horizontally direction.

It should be noted that the terms "in an essentially horizontally/vertically direction" do not contradict cutting the ice cream mixture with an angled cutting tool of between 0° and 12°, preferably between 4° and 10°, or between e.g. 2° and 6°, as the "essentially horizontally/vertically direction" is indicating the major direction of which the cutting tool is cutting the ice cream mixture.

According to at least one example embodiment, the method comprises the step of arranging the extruded ice cream mixture or ice cream product on a conveyer tray or conveyer belt. Hence, the ice cream product can be further transported for e.g. further processing, packaging and storing. In the embodiments where the ice cream mixture is extruded vertically, the ice cream products may fall under the force of gravity onto the conveyer tray after being cut into the intended shape. In embodiments where the ice cream is extruded horizontally, the ice cream mixture may be put on the conveyer tray prior to being cut into ice cream products. By cutting the ice cream mixture in a more efficient way by using the ultrasound cutting tool, the speed of the conveyer tray or conveyer belt may e.g. be increased as the ice cream products may be put on the conveyer tray in a more controllable and repeatable manner.

According to at least one example embodiment, the method comprises the step of inserting a stick into the ice cream mixture or ice cream product. For example, the stick may be inserted into the ice cream mixture during the process of extruding the ice cream mixture through the extrusion nozzle, e.g. through a notch in said extrusion nozzle. Hereby, an efficient way to introduce a stick into the ice cream is provided.

According to at least a second aspect of the present invention, an ice cream machine is provided. The ice cream machine comprises an extrusion nozzle for extruding an ice cream mixture with inclusions, a cutting tool for cutting the ice cream mixture from said extrusion nozzle into ice cream products, wherein said cutting tool is an ultrasound cutting tool.

Effects and features of this second aspect of the present invention are largely analogous to those described above in connection with the first aspect of the inventive concept. Embodiments mentioned in relation to the first aspect of the present invention are largely compatible with the second aspect of the invention.

The cutting tool may be arranged after the extrusion nozzle, possibly directly after said extrusion nozzle, such as e.g. at the exit of said extrusion nozzle.

It should be understood that the ice cream mixture may be provided to the extrusion nozzle from some kind of delivering means, such as e.g. a pipe or a tank comprising the ice cream mixture.

According to at least one example embodiment, the ice cream machine comprises a flap arranged at an orifice of said extrusion nozzle, wherein said cutting tool is arranged to cut the ice cream mixture against said flap.

According to at least one example embodiment, the extrusion nozzle is a horizontally arranged extrusion nozzle adapted to extrude the ice cream mixture horizontally or the extrusion nozzle is a vertically arranged extrusion nozzle adapted to extrude the ice cream mixture vertically.

According to at least one example embodiment, the cutting tool is arranged with an angle of between 0° and 12°, preferably between 4° and 10°, or between 2° and 6°, relative a cross section of the ice cream mixture For example, ice cream extruded from said horizontally arranged extrusion nozzle may be cut in an essentially vertical direction with said angled cutting tool of between 0° and 12°, preferably between 4° and 10°, or between 2° and 6°. According to another example, ice cream extruded from said vertically arranged extrusion nozzle may be cut in an essentially horizontal direction with said angled cutting tool.

According to at least one example embodiment, the cutting tool is arranged to move at least partly transversally in a direction following the flow of the ice cream mixture. Hereby the ice cream mixture may be cut with an angle and not in an entirely perpendicular direction to the flow of the ice cream mixture, as the latter could result in an undesirable angled end section of the ice cream product.

It should be noted that the angle of which the cutting tool is angled with may be explained as an angle between an axis being perpendicular to the direction of the flow of ice cream mixture out of said extrusion nozzle, and an axis being extending through a longitudinal direction of the cutting tool.

The cutting tool may comprise at least two ultrasound cutting knives (or ultrasound cutting horns) arranged to cut the ice cream mixture from opposite side of the ice cream mixture.

According to at least one example embodiment, the ultrasound cutting tool is operating at a frequency within the range of 5-25 kHz. Hereby, a frequency which is suitable for cutting through the ice cream mixture with or without inclusions are provided, while e.g. the material of the flap is chosen such that it is not affected by the ultrasound cutting tool, e.g. by having a plastic flap.

According to at least one example embodiment, the ice cream machine is arranged at an angle of between 30° and 60°, such as e.g. at 45°, compared to an horizontal arrangement of the ice cream machine. Hence, extrusion of ice cream mixture out of the extrusion nozzle may be carried out in a direction somewhere in between horizontally and vertically extrusion. It should be understood that the cutting tool is inclined together with the extrusion nozzle, and additionally the cutting tool may be arranged to cut the ice cream mixture while being angled of between 0° and 12°, preferably between 4° and 10°, or between 2° and 6° compared to an axis being perpendicular to the direction of flow of ice cream out of the extrusion nozzle. For example, the extrusion nozzle may be arranged to incline with 30° compared to a horizontal arrangement, while the cutting tool is arranged between 120° and 132° compared to a horizontal arrangement.

Hereby, for some embodiments, cutting of the ice cream mixture into ice cream products is facilitated and certain shapes of the ice cream products are more easily achieved. The ice cream products may also be put on the conveyer belt in a more controlled manner.

It should be noted that the terms horizontally and vertically when referring to the direction in which the ice cream is extruded by the extrusion nozzle, is to be interpreted as a substantially horizontally and substantially vertically direction, respectively.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1A:
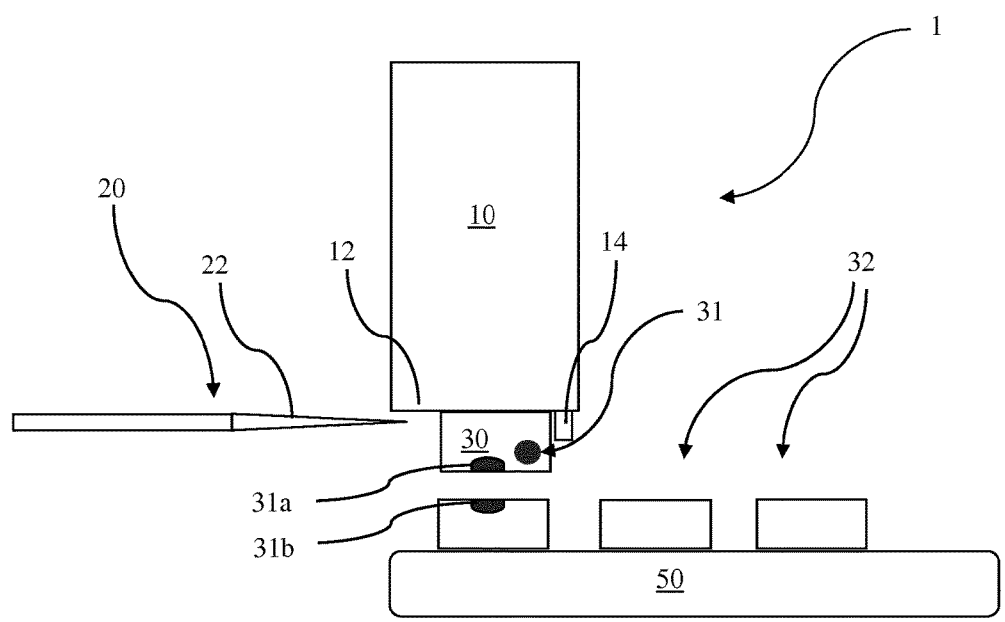
FIG. 1a is a schematic view of an ice cream machine in accordance with at least one embodiment of the invention.

FIG. 1a shows an ice cream machine 1 in accordance with one embodiment of the present invention. The ice cream machine 1 comprises an extrusion nozzle 10 and cutting tool 20 being an ultrasound cutting tool 20. The extrusion nozzle 10 is arranged to extrude an ice cream mixture 30 through an orifice 12 of the extrusion nozzle 10. The ultrasound cutting tool 20 is arranged to cut the ice cream mixture 30 extruded from the extrusion nozzle 10 into ice cream products 32.

The ice cream mixture 30 may comprise inclusions 31 or particles 31. As illustrated in FIG. 1a, an inclusion 31 has been cut into two pieces 31a, 31b by the ultrasound cutting tool 20.

In FIG. 1a, a flap 14 is arranged on the opposite side of the ice cream mixture 30 being extruded through the extrusion nozzle 10 as compared to from where the cutting tool 20 cuts through the ice cream mixture 30. The flap 14 is arranged as an anvil and hence, a cutting blade 22 of the cutting tool 20 may cut through the ice cream mixture 30 and an inclusion 31 and subsequently be stopped at the flap 14.

As can be seen in FIG. 1a, the ice cream mixture 30 is extruded vertically (or at least substantially vertically) and the cutting tool 20 is arranged to cut through the ice cream mixture 30 in an essentially horizontal direction. After cutting the ice cream mixture 30 into ice cream products 32, the ice cream products are put on a conveyer tray 50 for further transportation.

Figure 1B:
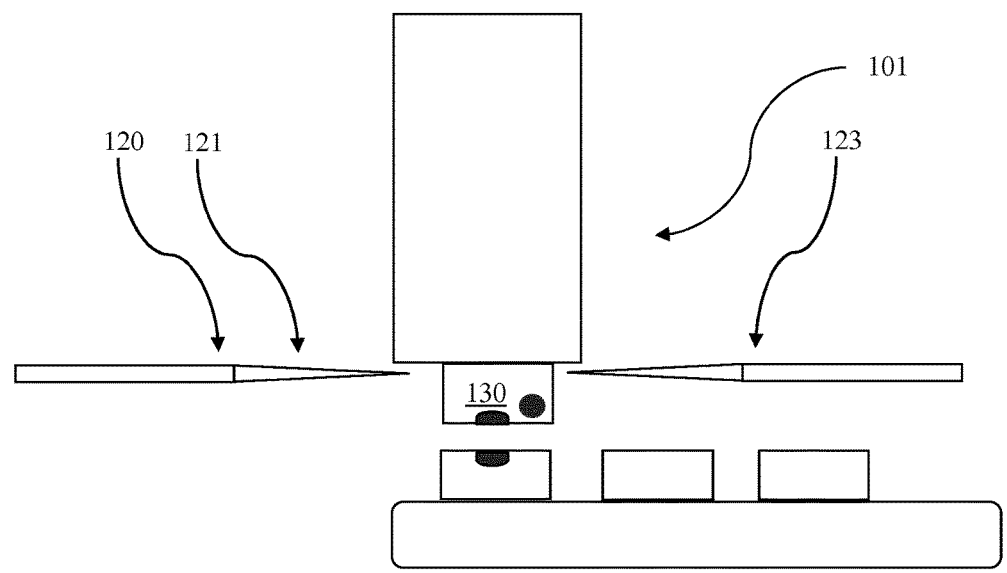
FIG. 1b is a schematic view of an ice cream machine in accordance with at least one embodiment of the invention.

In FIG. 1b, a similar ice cream machine 101 as described with relation to FIG. 1a is shown, but with the differences that no flap 14 is present in the ice cream machine 101 of FIG. 1b. Instead the cutting tool 120 comprises two ultrasound cutting knives 121, 123 (or ultrasound horns) arranged to cut through the ice cream mixture 130 from opposite sides. Hereby, each of the two cutting knives 121, 123 cut approximately halfway through the ice cream mixture 130. Thus, the time for cutting through the ice cream mixture 130 can be reduced.

In both FIGS. 1a and 1b, the cutting tool 20, 120 may be arranged to cut through the ice cream mixture, 30, 130 while being angled of between 0° and 12°, preferably between 4° and 10°. In the example embodiments of the invention having at least two ultrasound cutting knives (as cutting knives 121, 123 in FIG. 1b), the angle of the cutting tool can be set lower, as the two cutting knives 121, 123 cuts through the ice cream mixture 130 at approximately half the time compared to when using a cutting tool 20 having only one cutting knife 20 (as cutting tool 20 of FIG. 1a).

Figure 2A:
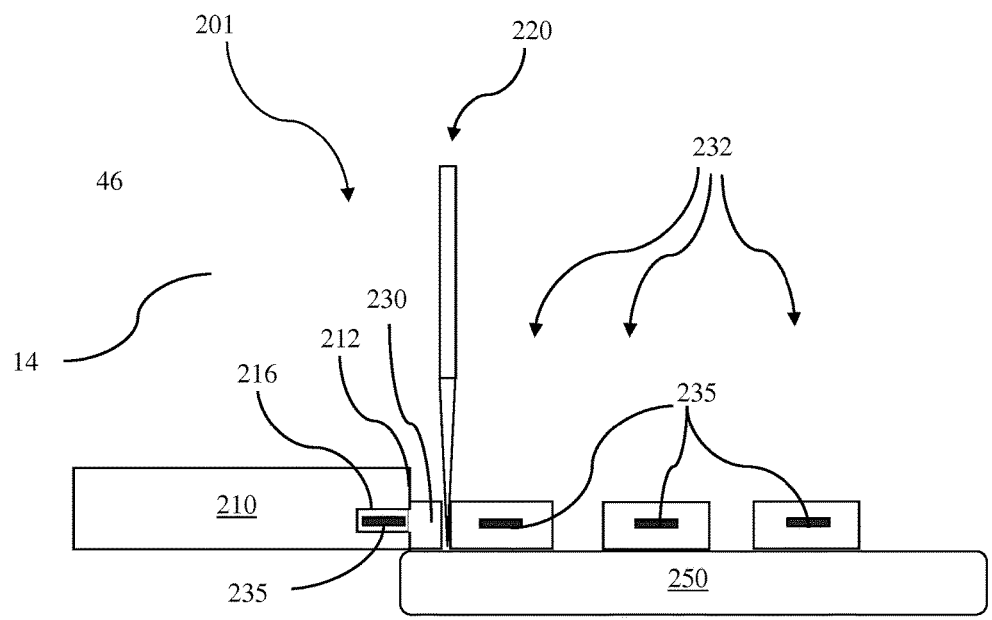
FIG. 2a is a schematic view of an ice cream machine in accordance with at least one embodiment of the invention.

FIG. 2a shows an ice cream machine 201 in accordance with one embodiment of the present invention. The ice cream machine 201 comprises an extrusion nozzle 210 and cutting tool 220 being an ultrasound cutting tool 220. The extrusion nozzle 210 is arranged to extrude an ice cream mixture 230 through an orifice 212 of the extrusion nozzle 210. Prior to, or together with, extrusion of the ice cream mixture 230 out of the extrusion nozzle 210, a stick 235 is inserted into the ice cream mixture through a notch 216 in the extrusion nozzle 210. It should of course be noted that although not explicitly shown here, there may also be a notch for inserting a stick into the ice cream mixture 30, 130 for the embodiments in FIGS. 1a and 1b with the corresponding functionality.

As can be seen in FIG. 2a, the ice cream mixture 230 is extruded horizontally (or at least substantially horizontally) and the cutting tool 220 is arranged to cut through the ice cream mixture 230 in an essentially vertical direction. Cutting of the ice cream mixture 230 into ice cream products 232 is carried out after the ice cream mixture 230 has been put on the conveyer tray 250.

Figure 2B:
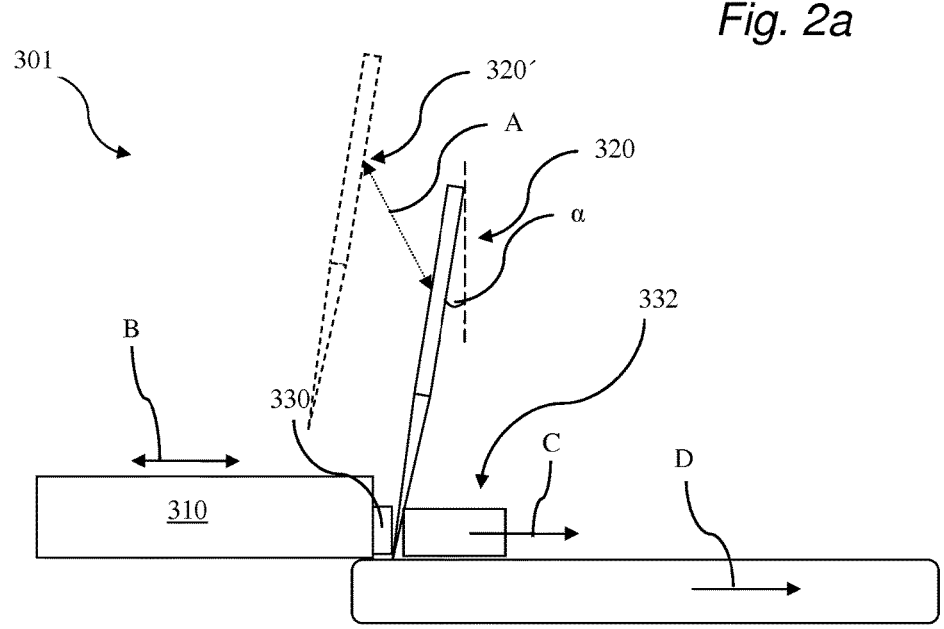
FIG. 2b is a schematic view of the angle of which the cutting tool cuts through the ice cream mixture in accordance with at least one embodiment of the invention.

In FIG. 2b, an ice cream machine 301 according to one embodiment of the invention where the cutting tool 320 cuts through the ice cream 330 mixture while being angled of approximately 5° is shown. The angle is indicated by α. This is advantageous because the size and shape of the ice cream products 332 can be adapted to the rate of flow of the ice cream mixture 330 out of the extrusion nozzle 310. By cutting the ice cream mixture 330 with an angled cutting tool as illustrated in FIG. 2b, the risk of getting an undesirable angled end section of the ice cream product 332 is reduced. Hence, the ice cream products 332 can be shaped closer to its intended shape.

Furthermore, as indicated by the arrow A, the cutting tool 320 may move at least partly transversally in the same direction as the flow of the ice cream mixture 330 out of the extrusion nozzle 310, and at least partly towards the ice cream mixture 330, when cutting through the ice cream mixture 330. Thus, the cutting tool 320 may cut through the ice cream mixture 330 while being angled as previously described, while the cutting tool 320 moves at least partly transversally along with the flow of ice cream mixture 330, and at least partly towards said ice cream mixture 330. The speed of which the cutting tool 320 moves transversally along with the flow of ice cream mixture 330 may be higher, such as e.g. slightly higher, compared to the speed of which the ice cream mixture flows, the latter being indicated by arrow C. Hereby, the shape of the ice cream products 332 can be controlled more easily. After the cutting tool 320 has cut through the ice cream mixture 330, it moves back to its original position, indicated by the cutting tool in dashed lines 320', and the procedure may be repeated.

As indicated in FIG. 2b, the extrusion nozzle 310 may moves backwards and forwards, indicated by arrow B, as the ice cream mixture 330 is extruded through the extrusion nozzle 310 and subsequently cut, and new ice cream mixture 330 is extruded through the extrusion nozzle 310. For example, the extrusion nozzle 310 may move forward in a direction following the extrusion of the ice cream mixture 330 out of the extrusion nozzle 310, indicated by arrow C, while extruding ice cream mixture 330 through the extrusion nozzle 310. The speed of the extrusion nozzle 310 may be the same as the speed of the conveyer belt, indicated by arrow D, minus the speed of which the ice cream mixture 330 is extruded through the extrusion nozzle 310, indicated by arrow C. Hence, the ice cream mixture 330 has preferably the same speed (being the speed of the extrusion nozzle 310 moving forward, and the speed of which the ice cream mixture 330 is extruded), as the speed of the conveyer belt. After the ice cream mixture 330 has been cut, the extrusion nozzle 310 may move backwards in a direction being opposite to said forward direction.

The ultrasound cutting tool 20 may also be referred to as an ultrasound cutting knife 20 or an ultrasound horn 20.

Figure 3:
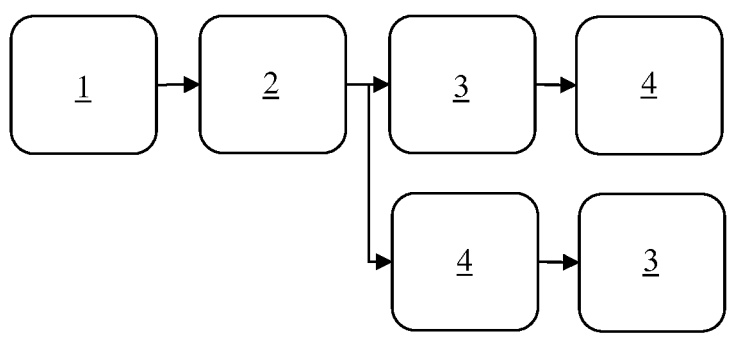
FIG. 3 is a flow-chart schematically illustrating at least one example embodiment of the invention.

The flow-chart in FIG. 3 schematically illustrates a method for producing an ice cream product using an ice cream machine 1, 101, 201, 301 as described with reference to FIGS. 1a, 1b, 2a and 2b (the reference numerals used in FIG. 1a are used below when describing the steps of the method in the flow-chart in FIG. 3).

In a first step 1, an ice cream mixture 30 with or without inclusions 31 is provided.

In a subsequent step 2, the ice cream mixture 30 is extruded through an extrusion nozzle 10.

Step 2 can be carried out by extruding the ice cream mixture 30 horizontally or by extruding the ice cream mixture 30 vertically. Prior to step 2, a stick may be inserted into the ice cream mixture. As an alternative example embodiment, a stick may be inserted into the ice cream mixture or ice cream product subsequently to step 2.

In a subsequent step 3 the ice cream mixture 30 is cut with an ultrasound cutting tool 20 into ice cream products 32.

Step 3 can according to one example embodiment be carried out by cutting said ice cream mixture 30 against a flap 14 arranged at an orifice 12 of said extrusion nozzle 10. Step 3 can according to one example embodiment be carried out by cutting the ice cream with an angled cutting tool of between 0° and 12°, preferably between 4° and 10°. Step 3 can according to one example embodiment be carried out by cutting the ice cream mixture with two ultrasound cutting knives from opposite sides of the ice cream mixture. Step 3 can be carried out by cutting the ice cream mixture 30 in an essentially horizontally or vertically direction.

In a step 4 the extruded ice cream mixture 30 or ice cream product 32 is put on a conveyer tray 50. In embodiments where extruded ice cream mixture 30 is put on the conveyer tray 50, step 4 is preferably carried out prior to step 3. In embodiments where ice cream mixture product 32 are put on the conveyer tray 50, step 4 may preferably be carried out subsequently to step 3.

The skilled person realizes that a number of modifications of the embodiments described herein are possible without departing from the scope of the invention, which is defined in the appended claims.

The invention claimed is:

1. A method for producing, from an ice cream mixture, an ice cream product with an ice cream machine having an extrusion nozzle and a cutting tool, the method comprising:
    extruding the ice cream mixture through the extrusion nozzle in a direction of a flow; and
    cutting the ice cream mixture with the cutting tool into the ice cream product while the cutting tool moves at least partly in the direction of the flow and while the cutting tool moves transversally with respect to the direction of the flow, wherein the cutting tool is an ultrasound cutting tool.

2. The method according to claim 1, wherein the ice cream mixture comprises inclusions.

3. The method according to claim 1, wherein the extrusion nozzle comprises a flap arranged at an orifice of the extrusion nozzle, and wherein the step of cutting the ice cream mixture with the cutting tool comprises cutting the ice cream mixture against the flap.

4. The method according to claim 1, wherein the cutting tool is angled between 0° and 12° relative to the direction of the flow and wherein the step of cutting the ice cream mixture comprises cutting the ice cream mixture with the angled cutting tool.

5. The method according to claim 1, wherein the cutting tool comprises at least two ultrasound cutting knives and wherein the step of cutting the ice cream mixture with the cutting tool comprises cutting the ice mixture with the at least two ultrasound cutting knives from opposite sides of the ice cream mixture.

6. The method according to claim 1, wherein the extrusion nozzle is arranged horizontally and the extruding is performed horizontally or wherein the extrusion nozzle is arranged vertically and the extruding is performed vertically.

7. The method according to claim 1, wherein the step of cutting comprises cutting the ice cream mixture in a horizontal or vertical direction.

8. The method according to claim 1, further comprising arranging the extruded ice cream mixture or ice cream product on a conveyer tray.

9. The method according to claim 1, further comprising inserting a stick into the ice cream mixture through a notch in the extrusion nozzle.

10. The method according to claim 1, wherein the cutting tool moves transversally at a speed higher than a speed at which the ice cream mixture flows in the direction of the flow.

11. An ice cream machine for forming ice cream products based on an ice cream mixture, the machine comprising:
    an extrusion nozzle for extruding the ice cream mixture in a direction of a flow, wherein the ice cream mixture has inclusions; and
    a cutting tool for cutting the ice cream mixture from the extrusion nozzle into the ice cream products while the cutting tool moves at least partly in the direction of the flow and while the cutting tool moves transversally with respect to the direction of the flow;
    wherein the cutting tool is an ultrasound cutting tool.

12. The ice cream machine according to claim 11, further comprising a flap arranged at an orifice of the extrusion nozzle, wherein the cutting tool is arranged to cut the ice cream mixture against the flap.

13. The ice cream machine according to claim 11, wherein the extrusion nozzle is a horizontally arranged extrusion nozzle adapted to extrude the ice cream mixture horizontally or wherein the extrusion nozzle is a vertically arranged extrusion nozzle adapted to extrude the ice cream mixture vertically.

14. The ice cream machine according to claim 13, wherein:
    the extrusion nozzle is a horizontally-arranged extrusion nozzle adapted to extrude the ice cream mixture horizontally; and
    the cutting tool is arranged to cut through the ice cream mixture in a vertical direction.

15. The ice cream machine according to claim 13, wherein:
    the extrusion nozzle is a vertically-arranged extrusion nozzle adapted to extrude the ice cream mixture vertically; and
    the cutting tool is arranged to cut through the ice cream mixture in a horizontal direction.

16. The ice cream machine according to claim 11, wherein the cutting tool is arranged with an angle of between 0° and 12° relative to the direction of the flow.

17. The ice cream machine according to claim 11, wherein the cutting tool comprises at least two ultrasound cutting knives arranged to cut the ice cream mixture from opposite side of the ice cream mixture.

18. The ice cream machine according to claim 11, wherein the ultrasound cutting tool is configured to operate at a frequency between 5 kHz and 25 kHz.

19. The ice cream machine according to claim 11, further comprising a conveyor tray adapted to transport the ice cream products.

20. The ice cream machine according to claim 11, wherein:
    the extrusion nozzle further comprises a notch arranged to insert a stick into the ice cream mixture.

* * * * *